United States Patent
Flores et al.

(10) Patent No.: US 11,364,571 B2
(45) Date of Patent: Jun. 21, 2022

(54) METHOD AND APPARATUS FOR LASER BEAM ROUGHENING OF SURFACES OF SUBSTRATES

(71) Applicant: Gehring Technologies GmbH, Ostfildern (DE)

(72) Inventors: Gerhard Flores, Ostfildern (DE); Martin Freitag, Nuertingen (DE); Wolfram Lohse, Hochdorf (DE)

(73) Assignee: Gehring Technologies GmbH, Ostfildern (DE)

( * ) Notice: Subject to any disclaimer, the term of this patent is extended or adjusted under 35 U.S.C. 154(b) by 848 days.

(21) Appl. No.: 16/078,344

(22) PCT Filed: Feb. 17, 2017

(86) PCT No.: PCT/EP2017/053668
§ 371 (c)(1),
(2) Date: Aug. 21, 2018

(87) PCT Pub. No.: WO2017/148716
PCT Pub. Date: Sep. 8, 2017

(65) Prior Publication Data
US 2021/0213566 A1    Jul. 15, 2021

(30) Foreign Application Priority Data
Feb. 29, 2016   (DE) .......................... 102016103578.5

(51) Int. Cl.
*B23K 26/352*   (2014.01)
*B23K 26/70*    (2014.01)
(Continued)

(52) U.S. Cl.
CPC ........ *B23K 26/3584* (2018.08); *B23K 26/009* (2013.01); *B23K 26/0643* (2013.01);
(Continued)

(58) Field of Classification Search
None
See application file for complete search history.

(56) References Cited

U.S. PATENT DOCUMENTS 4,178,632 A * 12/1979 Anthony .................. B25J 9/161
                                                  318/568.14
5,004,890 A *  4/1991 Lim ....................... B23K 26/10
                                                  219/121.62
(Continued)

FOREIGN PATENT DOCUMENTS

DE    19809367 A1    9/1999
DE    10032082 A1    1/2002
(Continued)

OTHER PUBLICATIONS

Machine translation of Japan Patent No. 5-057,549-A, Jul. 2021.*
(Continued)

*Primary Examiner* — Geoffrey S Evans
(74) *Attorney, Agent, or Firm* — Bond Schoeneck & King, PLLC; George McGuire

(57) ABSTRACT

The invention relates to a device for roughening cylinder bores using a beam tool and offering a very high level of process reliability even for a large quantity.

23 Claims, 7 Drawing Sheets

(51) Int. Cl.
*B23K 26/00* (2014.01)
*B23K 26/06* (2014.01)
*B23K 26/08* (2014.01)
*B23K 26/16* (2006.01)
*B23K 37/04* (2006.01)
*B23K 101/00* (2006.01)

(52) U.S. Cl.
CPC ...... *B23K 26/0648* (2013.01); *B23K 26/0876* (2013.01); *B23K 26/16* (2013.01); *B23K 26/702* (2015.10); *B23K 26/703* (2015.10); *B23K 26/705* (2015.10); *B23K 26/706* (2015.10); *B23K 37/0426* (2013.01); *B23K 2101/006* (2018.08)

(56) References Cited

U.S. PATENT DOCUMENTS

| | | | | | |
|---|---|---|---|---|---|
| 6,163,010 | A | * | 12/2000 | Kobsa | B23K 26/032 219/121.61 |
| 6,303,897 | B1 | * | 10/2001 | Bady | B23K 26/144 219/121.65 |
| 6,316,744 | B1 | * | 11/2001 | Nowotny | B23K 26/144 219/121.84 |
| 6,329,630 | B1 | * | 12/2001 | Sato | B08B 7/0042 219/121.64 |
| 6,462,302 | B1 | * | 10/2002 | Grow | F41A 21/00 219/121.68 |
| 6,844,521 | B2 | | 1/2005 | Staufer et al. | |
| 2004/0026388 | A1 | | 2/2004 | Staufer et al. | |
| 2009/0084786 | A1 | * | 4/2009 | Claypool | A47J 47/04 220/254.9 |
| 2011/0120981 | A1 | | 5/2011 | Paganelli | |
| 2013/0209745 | A1 | * | 8/2013 | Legoux | C23C 4/02 428/161 |
| 2016/0376690 | A1 | * | 12/2016 | Wang | C23C 4/02 123/193.2 |

FOREIGN PATENT DOCUMENTS

| | | |
|---|---|---|
| DE | 102005019757 A1 | 11/2006 |
| DE | 102013224207 A1 | 5/2015 |
| EP | 0950461 A2 | 10/1999 |
| EP | 2301706 A2 | 3/2011 |
| JP | 05057549 A * | 3/1993 |
| JP | 11314189 A * | 11/1999 |
| JP | 2006117994 A * | 5/2006 |
| JP | 2009046719 A * | 3/2009 |

OTHER PUBLICATIONS

Machine translation of Japan Patent No. 11-314,189-A, Jul. 2021.*
Machine translation of Japan Patent No. 2006-117,994-A, Jul. 2021.*
Machine translation of Japan Patent No. 2009-046719-A, Jul. 2021.*
International Search Report and Written Opinion Form PCT/ISA/210 and PCT/ISA/237, International Application No. PCT/EP2017/053668, pp. 1-15, International Filing Date Feb. 17, 2017, search report dated Sep. 7, 2017.
Publication No. WO/2017/148716, Publication Date Sep. 8, 2017.
Non-translated Chinese Office Action, dated Nov. 27, 2019, pp. 1-16.
Korean Office Communication, dated Feb. 18, 2020, pp. 1-7.

* cited by examiner

METHOD AND APPARATUS FOR LASER BEAM ROUGHENING OF SURFACES OF SUBSTRATES

CROSS-REFERENCE TO RELATED APPLICATIONS

This application is the U.S. National Stage Application of PCT Application No. PCT/EP2017/053668, filed Feb. 17, 2017 which relates and claims priority to German Application No. 10 2016 103 578.5, filed Feb. 29, 2016, the entire disclosure of each of which is incorporated herein by reference.

BACKGROUND OF THE INVENTION

The invention relates to a method and to a device for producing roughened surfaces. Said roughened surfaces are thermally coated after roughening. The aim of roughening is to achieve a high adhesive tensile strength of the applied metal layer or non-metal layer. This process is used primarily for cylinder bores in internal combustion engines. The thermal spray coatings are low-friction and low-wear and allow internal combustion engines to be optimized, particularly with regard to reducing exhaust gas emissions. After roughening and thermal coating, a final honing process takes place in a plurality of steps and advantageously gives the unfinished surface a tribologically suitable topography.

DE 102009051717 A1 describes a process chain that involves roughening by means of laser radiation, and a subsequent thermal coating.

EP 2799180 A2 describes a method for surface structuring which precedes the thermal coating. This application focuses on the properties of the laser beam and the parameterization thereof.

DE 102014207263 A1 likewise describes features relevant to the laser, in particular the design of the beam tool having a bifocal optical element.

None of the cited documents contain suggestions as to how roughening of cylinder bores could be achieved in mass production.

DISCLOSURE OF THE INVENTION

The problem addressed by the invention is that of providing manufacturing apparatus (devices), beam tools and methods which make it possible to roughen substrate surfaces, in particular those of cylinder bores in an internal combustion engine, in a fully automated and reliable manner with a machining period of less than one minute.

According to the invention, this problem is solved by a device for roughening surfaces. This design allows the beam tool to have a compact design.

Since the collimator is rotationally fixed to a carriage and does not rotate together with the spindle, said collimator can be connected to a beam source in a simple, reliable and low-loss manner, for example by means of an optical waveguide.

Since the focusing lens or the focusing optical element is arranged in the beam tool and thus rotates together with the spindle, the quality of the laser beam is improved. The transition between the stationary collimator and the rotating focusing lens is technically very simple: since the collimator enters the spindle at least in part, a simple labyrinth seal between the collimator and the rotatable spindle can safely and reliably prevent laser beams from entering said transition region, which is undesirable as it presents a danger to persons and objects. Furthermore, loss of sealing air located inside the spindle and the beam tool is minimized.

Since the focusing optical element or a focusing lens is mounted for conjoint rotation, the central position of the laser beam is very accurately maintained, which improves the machining quality.

The movement of the spindle in the direction of the Z axis and the rotation of said spindle ensure that the entire surface of the cylinder bore is roughened. For this purpose, it is important to adjust the superposition of the rotational movement by means of a regulation system/control system such that defined advancing movements can be achieved. The rotation of the spindle motor is transmitted to the spindle, which is structurally integrated in the compact spindle unit.

The masking element, which can be placed on the top cover surface independently of the advancing movement, is arranged on a separate carriage. The masking element is located on the underside of the angle bracket.

The laser beam is fed into the orientable collimator, which parallelizes the divergent light beam. If necessary, the collimator can be cooled by air or by another gaseous or liquid fluid.

The collimator can be arranged perpendicularly, as shown. A different mounting position is also possible, but requires optical components for beam deflection. There is a small gap between the non-rotating collimator and the rotating spindle, such that only a small amount of exhaust escapes. Moreover, the gap is designed as e.g. a labyrinth seal, such that it is not possible to see inside the spindle. The beam thus processed passes through the hollow spindle and enters the beam tool at the spindle end. The focusing lens of the focal length f, which rotates at the rotational speed of the spindle and focuses the beam on the surface of the bore, is located in the beam tool. A beam deflector is located in the beam tool, and is designed as a mirror or a prism such that significant heating does not occur and there is no damaging thermal focal point shift. Depending on the technical requirement for the normal direction, the angle of emergence can differ from the axis of the tool. At the beam exit, the beam passes through a protective glass that is surrounded by sealing air, such that melt material cannot enter the beam tool and contamination of the protective window remains low. The symmetrical distribution of mass, in particular at the lower end of the beam tool, improves concentricity even at high rotational speeds. It is nevertheless generally necessary to balance the beam tool accurately.

It should be noted that the focus can be finely adjusted. This can be achieved both manually and automatically. The beam tool can be designed to have an internal liquid cooling system or gas cooling system or external cooling fins for convection cooling.

In an advantageous embodiment of the invention, the beam tool and the workpiece to be machined can be moved relative to one another in the direction of a longitudinal axis of the bore to be machined (Z axis), such that the laser beam reaches the part of the bore which is to be machined owing to a combination of the rotational movement of the spindle and the relative movement of the beam tool and the workpiece.

Said relative movement can be achieved for example by providing the device with a mount and a stand, a workpiece seat being arranged on the mount and at least one base plate being guided on the stand so as to be slidable and positionable in the direction of an X axis. This arrangement also makes it possible to roughen one or more bores of a workpiece (for example a cylinder block) by moving the beam tool in the direction of the Z axis into the bore to be roughened.

The deflection apparatus in the beam tool can be designed as a mirror and/or as a prism. Both embodiments have a very compact build and only a relatively small mass, such that even high rotational speeds of the spindle are possible without the resulting centrifugal force deforming or otherwise overstressing the spindle. The performance of the beam tool according to the invention is therefore increased.

The device according to the invention is very flexible with regard to the arrangement of the collimator relative to the spindle or to the beam tool. A longitudinal axis of the collimator and a Z axis of the device or a rotational axis of the beam tool can thus enclose an angle of between 0° and 90°. If necessary, a mirror or a prism is arranged between the collimator and the beam tool.

In order to ensure that impurities cannot enter the inside of the spindle, a window that is transparent for the laser beam is arranged at an end of the beam tool which opposes the collimator. The laser beam exits the beam tool through said window.

The beam tool further comprises at least one sealing-air channel and an outlet opening for the sealing air. The outlet opening for the sealing air is designed such that the sealing air that exits the outlet opening keeps impurities away from the window. A constant power or power density of the laser beam is thus achieved over a long operating period. In other words: the intervals between periodically required cleanings of the window are extended. Both contribute to increasing the productivity of the beam tool according to the invention. The sealing air can simultaneously be used for cooling the beam tool.

It has been proved to be advantageous for the collimator to be connected to a laser light source by means of a fiber-optic cable. Neither the laser light source, nor the collimator, nor the fiber-optic cable rotate, which simplifies the construction of the device and of the beam tool and improves reliability.

In order to ensure that the laser beam does not travel beyond the actual working region, a masking device, which is guided so as to be slidable and positionable in the direction of the Z axis, is arranged on the base plate.

The masking device can comprise an annular element that can be positioned approximately coaxially with the spindle and slid in the direction of the Z axis. Said device can further comprise a planar element that is arranged orthogonally to the Z axis. Optimal masking of the laser beam is thus achieved, such that persons and/or objects in the region of the beam tool are protected.

In order to ensure a consistently high machining quality of the beam tool, a measurement apparatus is provided on the stand or on the mount for measuring the laser beam that exits the window of the beam tool. Said measurement apparatus primarily measures the power density of the laser beam. If the measured power density is below a specified threshold value, it can be inferred that the window of the spindle is contaminated by impurities and the window should be cleaned. After cleaning, the performance of the laser beam is restored to 100% of the original value.

Measurement apparatus for measuring the power density of a laser beam are available on the market. In the context of the claimed invention, it should be noted that the measurement apparatus is moved out of the working region of the beam tool according to the invention during the machining process (roughening of a bore).

When the power density of the laser beam needs to be measured, the measurement apparatus is positioned so as to be located at a determined distance from the window of the beam tool. The distance between the measurement apparatus and the beam tool is selected such that the focal point of the laser beam is not at the location of the measurement apparatus. Instead, the distance between the measurement apparatus and the spindle is such that the laser beam makes contact with the measurement apparatus over a greater area than in the focal point, and thus with a significantly lower power density. The power density can then be measured quickly and easily without the measurement apparatus being damaged by the high power density of the laser beam.

In another advantageous embodiment, a cleaning apparatus for the window of the beam tool is arranged on the stand or on the mount, the cleaning apparatus comprising a housing that has at least one opening and at least one nozzle for a cleaning medium, in particular gas such as $CO_2$, a liquid or dry ice, and in that the opening in the housing allows the beam tool, or at least the window of the beam tool, to enter the housing. It is thus possible to effectively and reliably remove impurities on the window of the spindle by means of a cleaning medium, preferably dry ice, such that the full performance of the beam tool is restored. During the cleaning process, the spindle can be rotated and/or the beam tool can be moved in the direction of the Z axis relative to the cleaning apparatus, such that all regions of the window are cleaned equally effectively.

The cleaning apparatus is also arranged on a guide so as to be slidable and positionable, such that said apparatus can be moved out of the working region of the beam tool during the roughening process. The cleaning apparatus is positioned in the working region of the beam tool only when the window of the beam tool needs to be cleaned, such that at least the window of the beam tool enters the opening of the cleaning apparatus by means of the movement of the beam tool in the direction of the Z axis, and said window can be cleaned there with dry ice, for example.

In order to minimize air pollution in the environment of the device according to the invention, and simultaneously minimize contamination of the window by impurities resulting from the vaporization and partial melting of the surface of the bore to be machined, an extraction apparatus comprising at least two extraction lines is provided, a separate extraction line preferably being provided for each bore that is to be roughened in a workpiece.

The extraction apparatus comprises a central extractor fan that is connected to all the extraction lines. According to the invention, a closing member, for example a closing flap, is arranged in each extraction line. In principle, the extraction lines are closed, and the closing members inside the extraction lines are only opened in those extraction lines that are connected to a bore that has just been roughened.

Therefore, if there are e.g. four bores in the workpiece and only one bore is roughened at a time, three extraction lines are closed and only one bore is connected to the extractor fan. The power requirement of the extractor fan is thus reduced without negatively affecting the efficacy of the extraction apparatus.

The transitions between the bores to be machined and the extraction lines are designed such that pressure loss is minimized. Said transitions can be designed as nozzles or diffusers, for example.

In another advantageous embodiment, a handling apparatus is provided which removes the machined workpieces from the device according to the invention and places a new workpiece onto the workpiece seat. The workpieces themselves can comprise indexing holes. Alternatively, it is also possible for the workpieces to be received on a base mount, and for said base mount to comprise indexing holes that interact with complementarily arranged pins of the workpiece seat of the device according to the invention, such that the bores of the workpiece to be machined are precisely positioned. This is important for achieving a uniform bore machining quality.

If the rotational axis of the beam tool does not coincide with the axis of the bore to be machined, the laser beam is made to focus more or less intensely by rotating the spindle when said beam is in contact with the surface of the bore to be machined. Consequently, the power density of the laser beam varies, leading to varying machining results. This is undesirable. For this reason, sufficiently accurate positioning of the bores with respect to the rotational axis of the spindle of the beam tool is important for reliable mass production. A particular advantage of roughening by means of a laser beam according to the invention is that the positioning accuracy requirement is not especially high, because the laser beam has a more or less constant intensity within the Rayleigh length. The Rayleigh length under the process conditions is approximately 0.6-0.8 mm. Positioning accuracy of ±0.3-0.4 mm is therefore sufficient. This degree of accuracy is easily achieved by a modern workpiece machine.

Since the beam tool can be moved in the direction of the X axis, the spindle can also be positioned very precisely relative to the bore. Manufacture-related variations in the position of the bore in the workpiece to be machined can thus be compensated. The above-mentioned positioning accuracy of the beam tool with respect to the center of the bore to be machined can be easily achieved even if the beam tool can be moved only in the direction of the X axis and not in the direction of the Z axis. The construction of the manufacturing device according to the invention is therefore relatively simple and cost-effective.

The invention also relates to a method for roughening substrate surfaces by means of a device comprising one of the preceding claims, said method having the following method steps:
- placing the masking device onto the front end of the bore of which the surface is to be roughened,
- inserting the spindle into the bore, and
- rotating the spindle
- and/or moving the spindle (27) and/or the workpiece (11) in the direction of the Z-axis such that the laser beam roughens the surface of the bore (61) to be machined, in a helical shape or in the shape of a plurality of adjacent rings and with a defined advancing movement.

This very simple method allows a bore to be machined quickly and reliably.

It is possible to leave the laser beam switched on, even when the laser beam is moved over an opening in the bore to be machined, and even when the laser beam is located outside a bore to be machined, the laser beam can be masked by a screen such that the laser beam does not harm persons working in the vicinity or objects in the surroundings. This makes it easier to control the roughening process. If bores having additional ventilation holes or recesses for the connecting rods are to be machined, it is not necessary to switch off the beam in the region of the holes because the laser beam defocuses on a workpiece surface to a greater degree than on the bore to be machined. Owing to the resultingly low beam intensity, a roughening process does not take place in this case.

Alternatively, the laser beam can be switched on precisely when it comes into contact with a surface to be roughened. This saves energy and reduces the cost of providing screens.

In this case, the screen is arranged at such a distance from the spindle or from the window of the beam tool that the laser beam is defocused when it comes into contact with the screen, and the power density of the laser beam is consequently so low that the screen is not damaged.

Furthermore, the extraction apparatus extracts the air that is mixed with residue from the laser machining from the bore being machined. The air in the immediate surroundings of the device according to the invention is therefore improved, and the window of the laser tool is contaminated to a lesser extent. The process stability of the roughening process is therefore improved, and the intervals at which it is necessary to measure the power of the laser beam can be extended. This increases the productivity of the device according to the invention.

In another advantageous embodiment of the method according to the invention, one or more parameters of the beam quality, in particular the power density of the laser beam, are measured after specified intervals, for example after a determined period of machining or after a determined number of pieces has been reached and, depending on the result of said measurement, either machining is immediately continued or the window of the beam tool is cleaned so as to restore the performance of the laser beam to its original value.

This process, which is dependent on the result of the measurement of the laser beam, ensures optimal productivity and consistent machining results even when there is a very large number of pieces.

Further advantages and advantageous embodiments of the inventions can be found in the following drawings, in the description thereof and in the claims. All the features disclosed in the drawings, in the description thereof and in the claims can be considered either individually or in any desired combination in the context of the invention.

DETAILED DESCRIPTION

Figure 1:
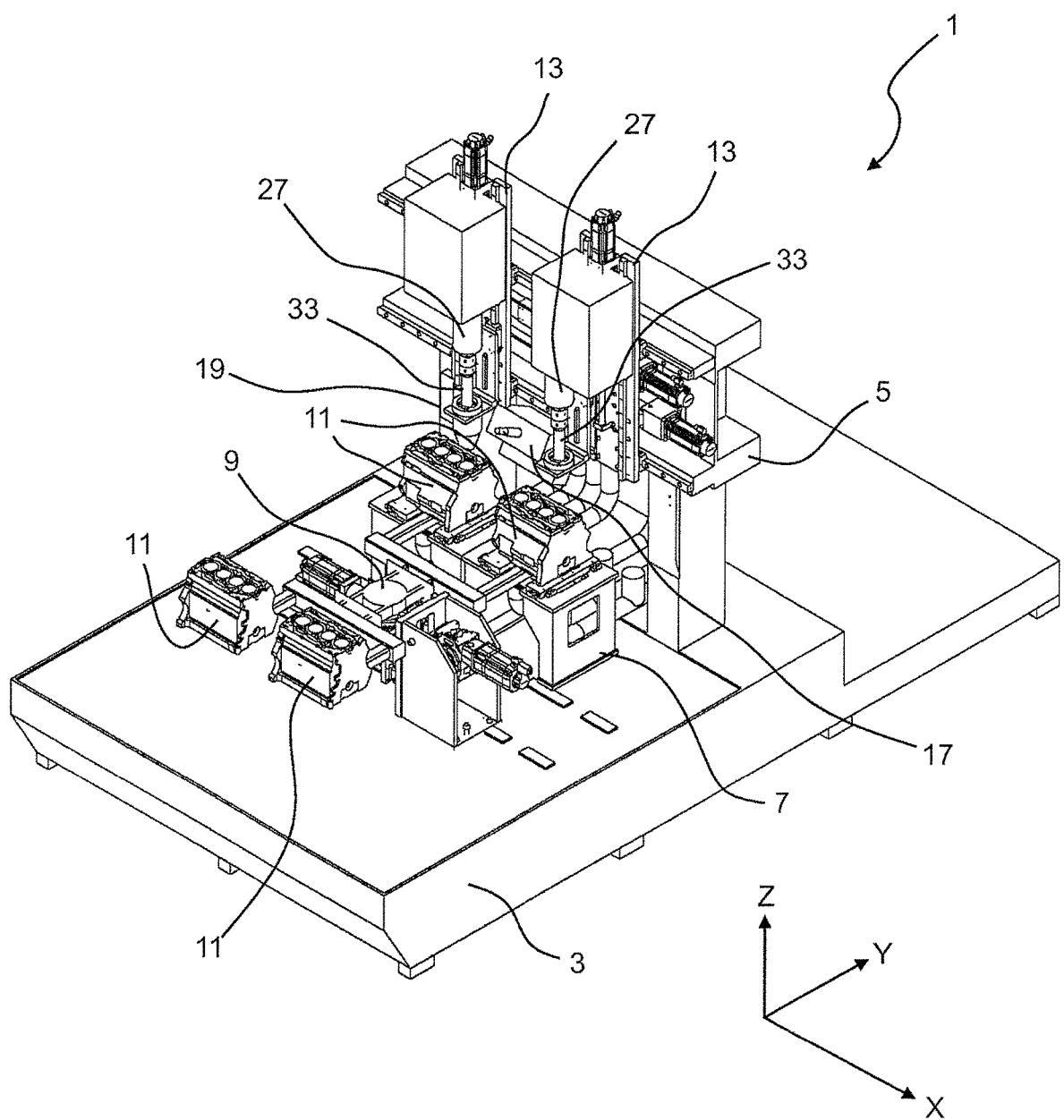
FIG. 1 is a view of the entire device according to the invention.

FIG. 1 is an isometric and somewhat simplified view of an embodiment of a device 1 according to the invention, comprising a mount 3 and a stand 5. A workpiece seat 7 and a handling apparatus 9 are arranged on the mount 3. The handling apparatus 9 can be designed as a changeable gripper, as is shown in FIG. 1.

In this embodiment, the workpieces 11 are cylinder blocks, having four cylinder bores (not denoted by a reference sign), from internal combustion engines.

In these embodiments, two spindles 27 that can be moved and positioned in the direction of the X axis are arranged on base plates 13 on the stand 5. In addition, a guide, a drive and measurement apparatus are provided for detecting the position of the base plates 13. Said linear guides and said drives are known from the prior art, and are therefore not described in more detail.

Figure 2:
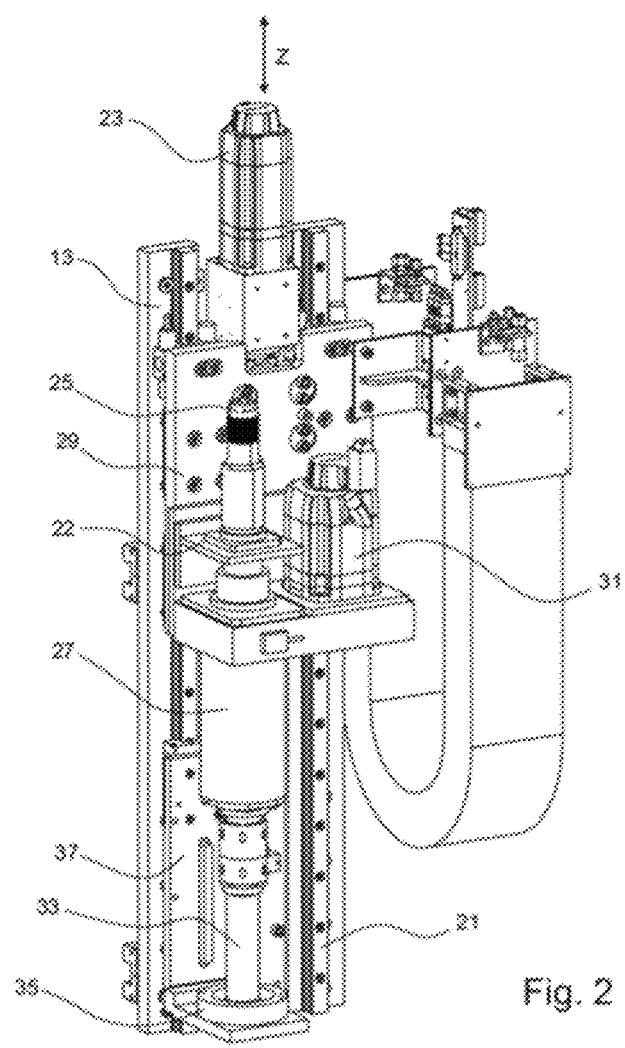
FIGS. 2 and 3 are details of the beam tool according to the invention.
Figure 3:
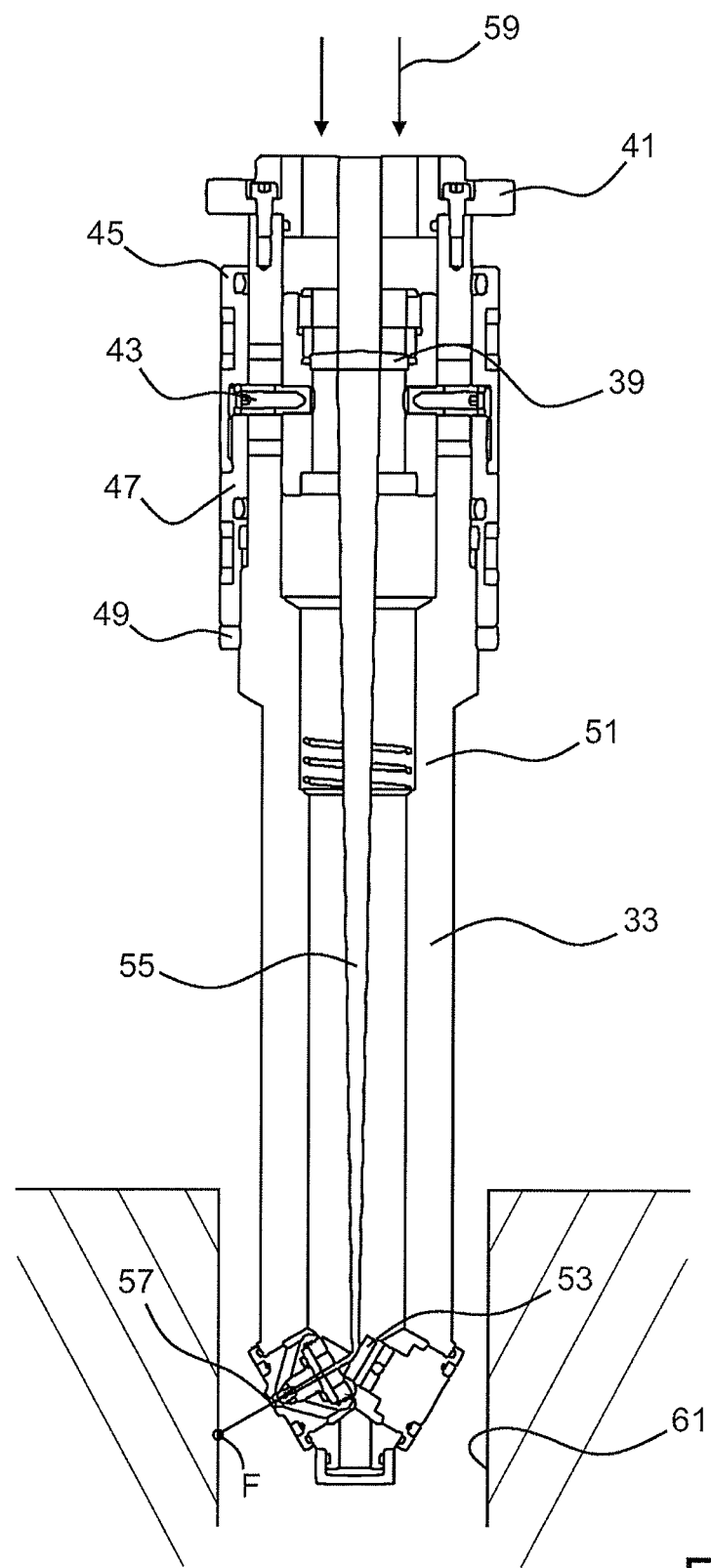

Beam tools 33, which are described in more detail below in the context of FIGS. 2 and 3, are arranged on the spindles 27. The beam tools 33 can be operated independently of one another and moved in the direction of the X axis and of the Z axis. It is therefore possible to machine a plurality of bores in one or more workpieces 11 simultaneously or time-offset from one another.

A measurement apparatus 17 for measuring the power density and the laser beam is arranged between the beam tools 33. The measurement apparatus is described in more detail in the context of FIG. 4.

Figure 5:
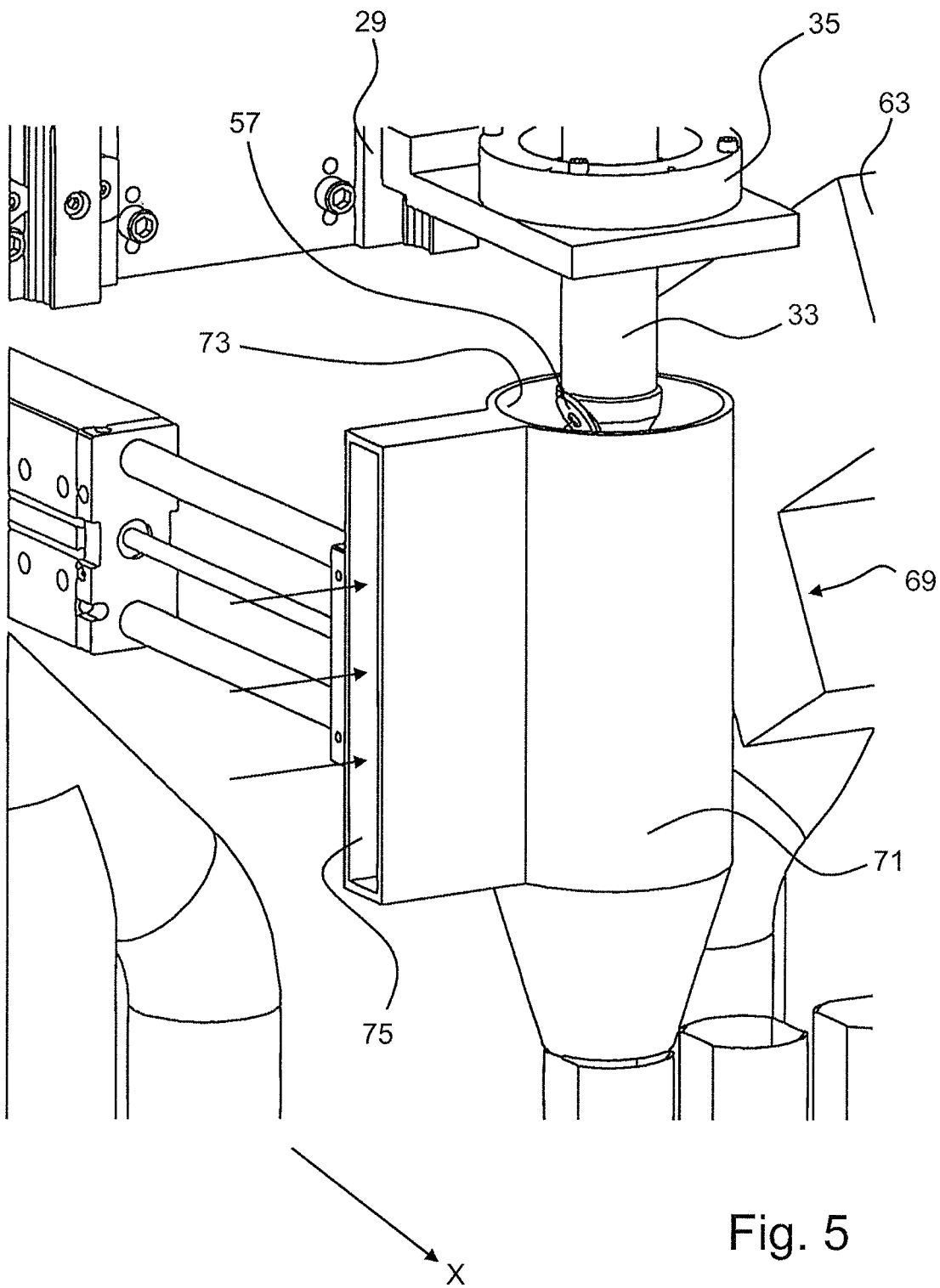
FIG. 5 is a schematic view of a cleaning device according to the invention.

A cleaning apparatus 19, which is explained in more detail in the context of FIG. 5, is provided on the left-hand side of the stand 5, mostly covered by the left-hand beam tool 33.

FIG. 2 is a detail of FIG. 1, specifically a beam tool 33 that is connected to the spindle 27 and can be moved in the direction of a Z axis.

A linear guide 21 is arranged on the base plate 13. The linear guide also comprises a linear drive and sensors for detecting the position of the beam tool along the Z axis. Said components are known from the prior art, and for the sake of clarity are not shown individually.

A carriage 29 is arranged on the linear guide 21. The carriage 29 can be moved in the direction of the Z axis. The carriage 29 supports a collimator 25 and a drive 23 for the spindle 27. In this embodiment, the collimator 25 is rigidly connected to the carriage 29 by means of an angular piece 22. The beam source and a fiber-optic cable, which supply light to the collimator 25, are not shown in FIG. 2 so as to make the collimator 25 clearly visible.

The collimator 25 projects in part into the spindle 27, which is rotatably fastened to the carriage 29. A rotary drive for the spindle 27 is denoted by reference sign 31. The rotary drive 31 is also fastened to the carriage 29.

In FIG. 2, a beam tool 33 is connected to the spindle 27, underneath said spindle. A deflection apparatus and a window (see FIG. 3) are arranged on the end of the beam tool 33 which is the lower end in FIG. 2. In FIG. 2, the deflection apparatus and the window are mostly covered by a masking device 35.

The masking device 35 is guided on a different carriage 37 on the guide 21, and can be moved in the direction of the Z axis independently of the beam tool 33. The masking apparatus 35 is an annular structure positioned concentrically with respect to the longitudinal axis of the spindle 27 and of the beam tool 33. The masking apparatus 35 is preferably made of copper, because copper can absorb the energy of the laser beam well and, owing to its good heat conductivity, dissipates said energy quickly.

In FIG. 3, the end of the spindle 27 is only implied. At the end of the spindle 27 is a flange 41, to which the beam tool 33 is fastened. A partial section of the beam tool 33 is shown.

A focusing lens 39 is arranged in the beam tool 33. The focusing lens 39 focuses the light of a laser beam 55, which light is aligned by the collimator 25, onto a focal point F located outside the beam tool. The surface of the bore 61 to be machined is located at the focal point F.

Therefore, when the spindle 27, together with the beam tool 33, performs a rotation about the Z axis, a circular or annular region of the bore comes into contact with the laser beam 55 and is roughened according to the invention. When the beam tool 33 is moved in the direction of the Z axis while the spindle 27 rotates, a helical or spiral-shaped line is produced. The focal point of the laser beam 55 moves along said line over the bore 61 that is to be roughened. Alternatively, a "ring" of the bore surface can be machined, and the beam tool can then be moved in the direction of the Z axis by the machining width of the beam tool 33. This process is repeated until the entire surface of the bore 61 to be machined has been roughened.

When the central axis of the bore 61 to be machined and the rotational axis of the spindle 27 coincide, the laser beam has a uniform effect over the entire surface of the bore, and therefore the laser-beam machining result on the bore is very uniform.

For this reason too, it is important for the beam tool 33 to be movable and positionable in the direction of the X-axis, since the rotational axis of the beam tool 33 can then be optimally oriented with respect to the longitudinal axis of the bore 61 to be machined. If necessary, this can be supported by measurement apparatus that detect the exact position of the bore to be machined, such that an optimal machining quality is achieved even if the bores 61 in the workpiece 11 have particular manufacture-related positional tolerances.

A flange 41 can be seen in FIG. 3. Said flange is part of the tool spindle 27. The beam tool 33 is bolted to the spindle 27 by means of said flange. The beam tool 33 can be exchanged, such that a suitable beam tool 33 can be attached to the spindle 27 depending on the length of the bore to be machined and/or on the diameter of the bore to be machined.

The focusing lens 39 is positioned in the desired location with respect to the flange 41 of the spindle by means of pins 43 of an upper adjustment ring 45, of a lower adjustment ring 47 and of a further adjustment ring 49. It is thus possible to change the position of the focal point F. In this way, the beam tool 33 can be adjusted to different bore diameters. The distance from the focal point F to the rotational axis of the spindle 27 is generally set such that said distance coincides with the surface of the bore 61 to be machined.

A spring 51 compensates for temperature fluctuations, such that it is possible to mount the focusing lens 39 without clearance.

A deflection apparatus 53, which is a deflection mirror in this embodiment, is arranged at the lower end of the beam tool 33. However, it is also possible for the deflection apparatus 53 to comprise a prism.

Beginning at the focusing lens 39, the laser beam 55 becomes thinner and thinner until it eventually reaches the focal point F. The power density is naturally at its highest here.

The laser beam 55 exits the beam tool 33 through a window 57 that is transparent for the laser beam and prevents impurities reaching the inside of the beam tool 33.

A sealing-air inlet 59 is shown at the end of the beam tool 33 which is the upper end in FIG. 3. The sealing air reaches the lower end of the beam tool through the inside thereof, and there passes out through a nozzle (not visible in FIG. 3) such that an air curtain is laid over the outer face of the window 57, and consequently no impurities, or very few impurities, reach the surface of the window 57. When impurities of this type accumulate on the window 57, the power density and the power of the laser beam are reduced in the focal point F, and the work result of the beam tool deteriorates. The sealing-air supply 59 is therefore a useful means for increasing the process reliability.

FIG. 3 shows a bore 61 in a very simplified manner. FIG. 3 shows clearly that the longitudinal axis of the bore 61 and the longitudinal axis of the spindle 27 and of the beam tool 33 extend coaxially with respect to one another, and that the focal point F is positioned at the location of the surface of the bore 61. Therefore, when the beam tool 33 is rotated 360°, the focal point F moves on a circular path over the bore 61, and there carries out the desired roughening of the surface. When said rotational direction is combined with an advancing movement in the direction of the Z axis, a helical line is produced, along which the focal point F moves over the surface of the bore 61 such that the entire surface of the bore 61 can be roughened. Of course, the advancing speed and the rotational speed of the spindle 27 should be coordinated such that the entire surface of the bore 61 is roughened.

In order to ensure than the power of the laser beam 55 in the focal point F remains constant, a measurement apparatus 63, which can be arranged for example on the stand 5, is provided on the device according to the invention.

Figure 4:
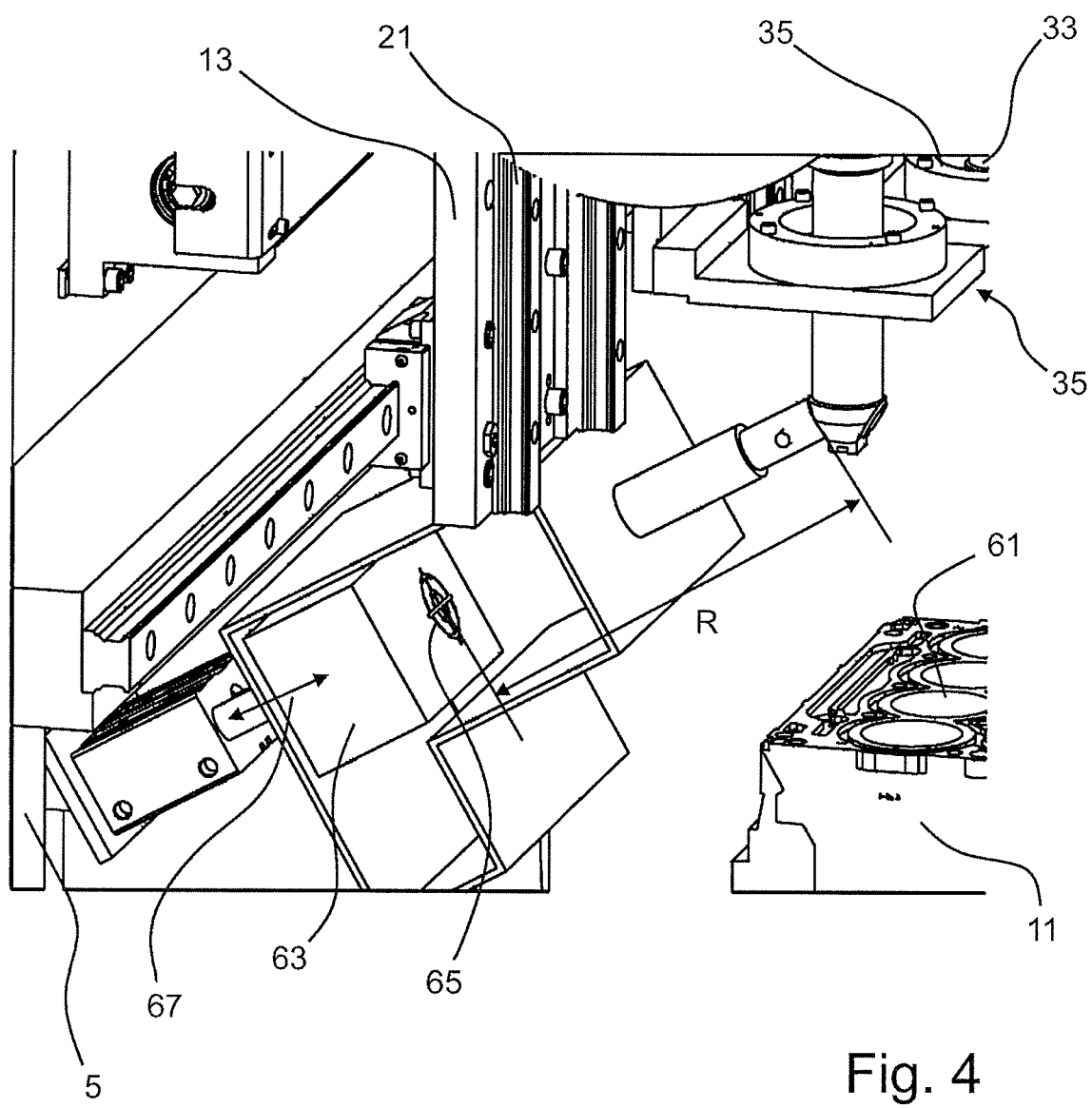
FIG. 4 is a schematic view of the measurement apparatus for measuring the performance of the laser beam.

A measurement apparatus 63 of this type is schematically shown in FIG. 4. A measurement field of the measurement apparatus is denoted by reference sign 65. Said measurement field is designed such that the laser beam 55 makes contact with the measurement field 65 orthogonally. For this reason, the measurement apparatus 63 is positioned diagonally.

The measurement apparatus 63 can be moved in the direction of a double-headed arrow 67, such that a distance R between the window of the beam tool and the measurement field 65 can be adjusted. In the position shown in FIG. 4, the measurement apparatus 63 is located outside the machining region, i.e. behind the base plate 13. When it is necessary to measure the power of the laser beam 55, the measurement apparatus 63 in FIG. 4 is moved upwards to the right in the direction of the double-headed arrow 67 until the distance R has the desired value. In this case, care should be taken so that the measurement field 65 is not positioned in the focal point F of the laser beam, because the power density of the laser beam 55 there is so high that the measurement field 65 will be damaged.

The measurement field 65 is thus positioned such that the laser beam 55 does not make contact with the measurement field 65 at its maximum power density, but instead at a power density that does not cause damage to the measurement field 65.

The power density of the laser beam 55 is determined in the measurement field 65. If the power density is under a specified threshold value, then there are too many impurities on the window 57 and the window 57 must be cleaned.

A cleaning apparatus 69 suitable for this purpose is shown in FIG. 5. The cleaning apparatus 69 comprises a housing 71 that has an opening 73. Furthermore, there is a supply opening 74 for the cleaning medium, preferably dry ice.

The cleaning apparatus 69 can be moved in the direction of an X axis, such that the cleaning apparatus 69 is moved outside the working region of the beam tool 33 when the laser is roughening a bore. FIG. 5 shows the position of the cleaning apparatus 69 in which the beam tool 33 and the window 57 at the lower end of the beam tool 33 can be cleaned. The window 57 is just visible in the opening 73 of the housing 71.

When the window 57 needs to be cleaned, the beam tool 33 moves even further into the housing 71. The window 57 is designed such that the cleaning medium, which reaches the inside of the housing 71 through the supply opening 75, is applied directly thereto. It is particularly preferable for dry ice to be used as the cleaning medium, because dry ice has an effective cleaning action and evaporates without leaving residue. The remaining impurities drop downwards and can be collected and removed at the lower end of the housing 71.

In order for the window 57 to be cleaned evenly, it can be advantageous to oscillate the beam tool 22 in the direction of the Z axis and/or to rotate the beam tool about the Z axis during the cleaning process.

Figure 6:
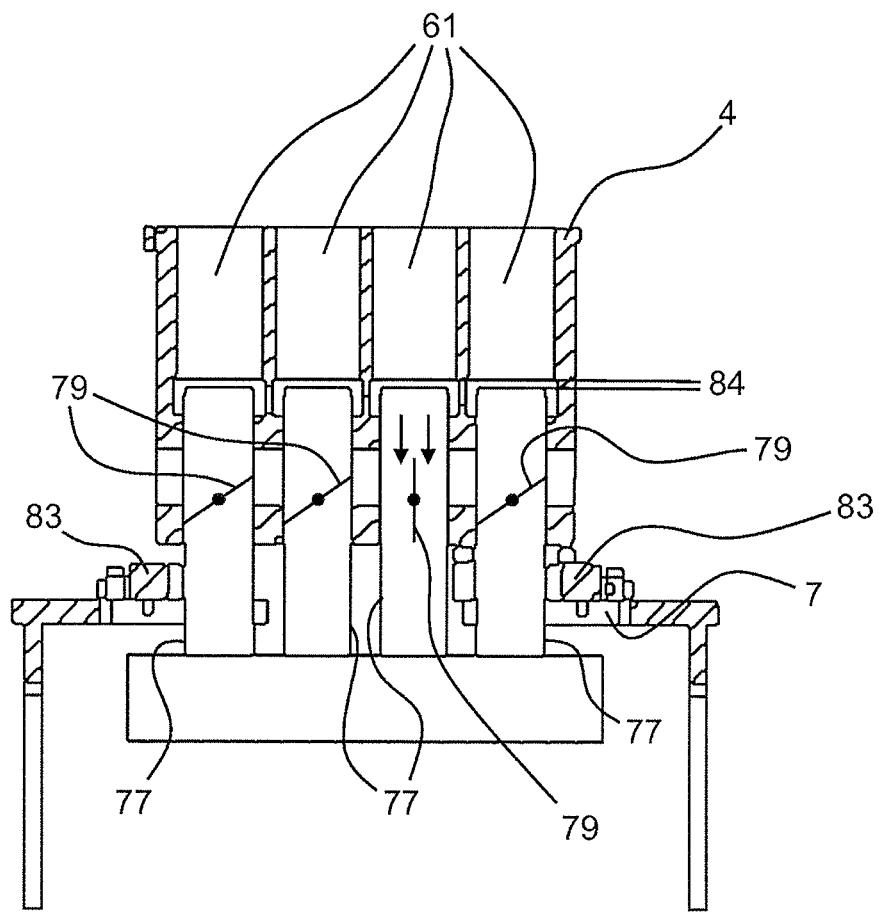
FIG. 6 is a detail of the extraction apparatus according to the invention.

FIG. 6 shows a part of the extraction apparatus according to the invention. In this embodiment, four bores 61 are provided in a cylinder block (workpiece). An extraction line 77 is attached to the lower end of each bore 61. A closing member 79, for example in the form of a butterfly valve, is provided in each extraction line 77. An extraction line 77 is associated with each bore 61 of the workpiece 11. If laser machining is being carried out in e.g. the second bore from the right, the closing member 79 of the associated extraction line 77 opens and the fumes and impurities resulting from the laser machining can be extracted through the extraction line 69.

The ends 84 of the extraction lines 77 which are the upper ends in FIG. 6, are designed as for example a nozzle, such that the pressure loss in the transition region between the bore 61 and the extraction line 77 is minimal.

Since laser machining is not simultaneously being carried out in the other bores 61 in the embodiment shown in FIG. 6, the closing members 79 of the associated extraction lines 77 remain closed. The volumetric flow rate and energy required for an extractor fan is thus reduced, and the extraction of impurities in the second bore from the right in FIG. 6 is made more effective.

Figure 7:
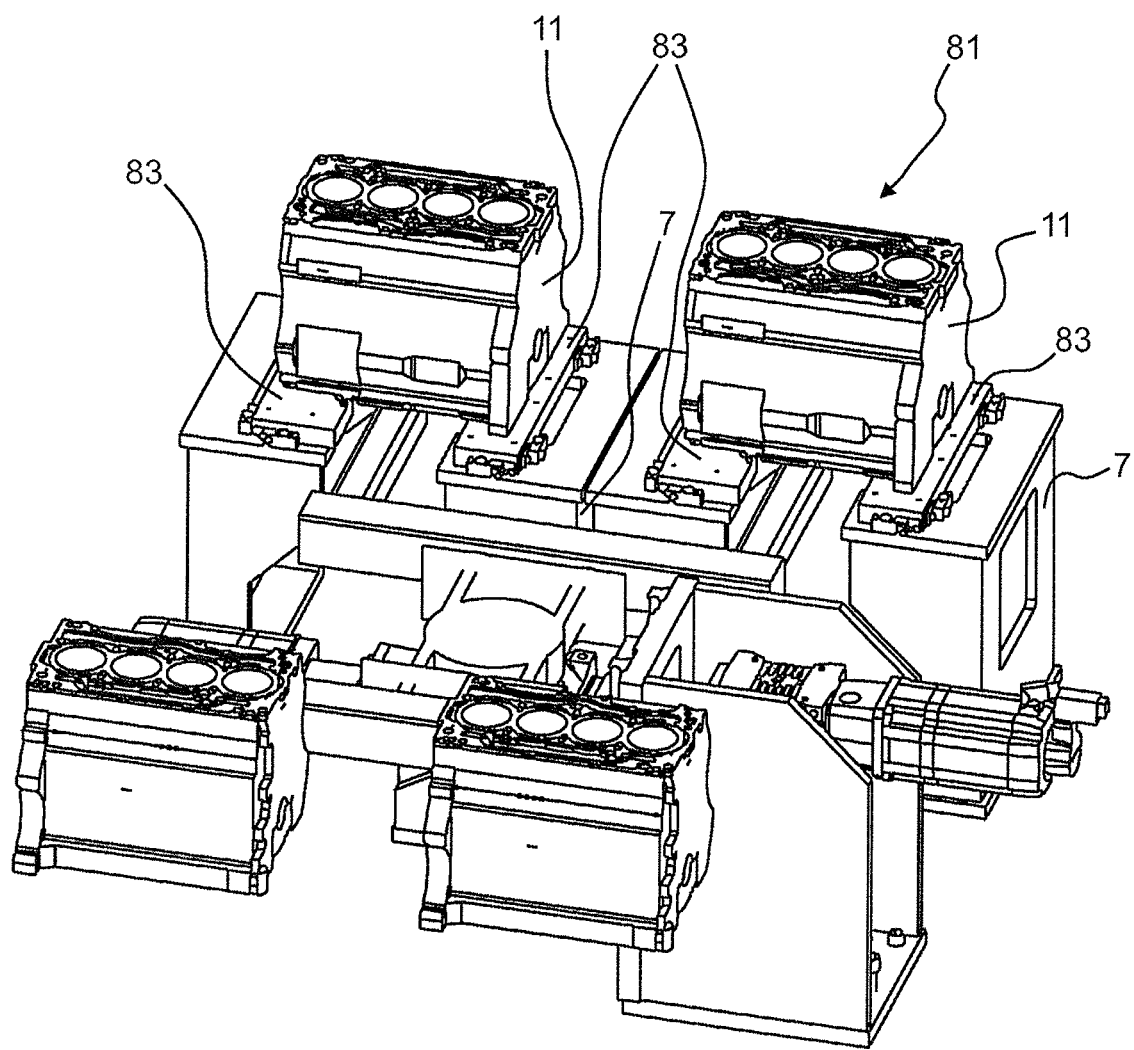
FIG. 7 shows an embodiment of a handling apparatus according to the invention.

A handling apparatus 81 of this type is schematically shown in FIG. 7. Said apparatus is designed as a changeable gripper. The workpieces 11 are placed on the workpiece seats 7 by means of mounts 83, and precisely positioned by means of indexing devices. After the workpieces 11 have been machined, they are removed from the workpiece seats 7 by means of the handling apparatus 81 and new, unmachined workpieces 11 are placed on the workpiece seats 7.

What is claimed is:

1. Device for roughening surfaces, comprising at least one carriage, each carriage supporting at least one collimator and at least one spindle that can be rotationally driven, a laser beam tool being connected to each spindle, characterized in that the laser beam tool comprises a focusing lens or a focusing optical element and a deflection apparatus, in that the deflection apparatus is arranged on an end of the laser beam tool which opposes the collimator, and in that the focusing lens or the focusing optical element rotates together with the beam tool, wherein a cleaning apparatus is arranged on the stand or on the mount, in that the cleaning apparatus comprises a housing that has at least one opening and at least one supply opening for a cleaning medium, and in that the opening allows at least one of the spindle and the window of the spindle to enter the housing, further characterized in that the cleaning apparatus is guided on a guide such that if necessary, the cleaning apparatus can be positioned coaxially with a longitudinal axis of the spindle.

2. Device according to claim 1, characterized in that the laser beam tool and a workpiece to be machined can be slid relative to one another in the direction of an X axis.

3. Device according to claim 1, further comprising a mount and a stand, wherein a workpiece seat is arranged on the mount, wherein at least one base plate is guided on the stand so as to be slidable and positionable in the direction of an X axis, and wherein the at least one carriage is guided on the base plate so as to be slidable in the direction of an X axis.

4. Device according to claim 1, characterized in that the deflection apparatus comprises a mirror and/or a prism.

5. Device according to claim 1, characterized in that a longitudinal axis of the collimator and a Z axis of the device can enclose an angle of between 0° and 90°.

6. Device according to claim 1, characterized in that at least one of a mirror and a prism, which orients the laser beam parallel to the Z-axis, is arranged between an exit of the collimator and the beam tool.

7. Device according to claim 1, characterized in that the spindle comprises, at the end thereof which opposes the collimator, a window that is transparent for the laser beam, in that the spindle comprises at least one sealing-air channel and an outlet opening for the sealing air, the sealing air that exits the outlet opening keeps impurities away from the window.

8. Device according to claim 1, characterized in that the collimator is connected to a laser light source by means of a fiber-optic cable.

9. Device according to claim 1, characterized in that a masking device is guided on the base plate so as to be slidable and positionable in the direction of a Z axis.

10. Device according to claim 9, characterized in that the masking device can be slid coaxially with the spindle.

11. Device according to claim 1, characterized in that a measurement apparatus for measuring the laser beam that exits the window of the laser beam tool is provided on a stand or on a mount.

12. Device according to claim 11, characterized in that the measurement apparatus is guided on a guide such that a distance (R) between the measurement apparatus and the spindle can be adjusted.

13. Device according to claim 1, characterized in that the laser beam tool is positionable relative to a bore to be machined with a degree of accuracy that is smaller than a Rayleigh length of the laser beam.

14. Device according to claim 1, characterized in that an extraction apparatus is provided one of a stand and a mount, in that the extraction apparatus comprises at least two extraction lines and in that the extraction apparatus comprises an extractor fan that is connected to all the extraction lines.

15. Device according to claim 14, characterized in that a controllable closing apparatus is provided in each extraction line.

16. Device according to claim 1, characterized in that it comprises a handling apparatus, and in that the handling apparatus moves the workpieces to be machined into the working region of the device, and moves the machined workpieces out of the working region of the device.

17. Device according to claim 16, characterized in that the handling apparatus a rotary gripper.

18. Method for roughening substrate surfaces using a device comprising at least one carriage, each carriage supporting at least one collimator and at least one spindle that can be rotationally driven, a laser beam tool being connected to each spindle, characterized in that the laser beam tool comprises a focusing lens or a focusing optical element and a deflection apparatus, in that the deflection apparatus is arranged on an end of the laser beam tool which opposes the collimator, and in that the focusing lens or the focusing optical element rotates together with the laser beam tool, comprising the following method steps:
    placing a masking device onto the bore of which the surface is to be roughened,
    inserting the beam tool into the bore,
    moving the laser beam tool in the direction of the Z axis, wherein at least a window at the end of the spindle is moved into the working region of the measurement apparatus at regular intervals, and in that the laser beam exiting the window is then measured and, depending on the result of the measurement of the laser beam, a window of the beam tool is cleaned.

19. Method according to claim 18, characterized in that a beam source is switched on during the entire roughening process.

20. Method according to claim 18, characterized in that a beam source is switched off as soon as at least the desired part of the bore has been roughened.

21. Method according to any of claim 18, characterized in that, during the machining process, the extraction apparatus extracts the air that is mixed with residue from the laser machining from the bore being machined.

22. Method according to claim 21, characterized in that only the air from the bore or bores being machined is extracted.

23. Method according to claim 18, characterized in that, depending on the result of the measurement of the laser beam, the window of the beam tool is put directly back into operation for roughening bores without an interposing cleaning step.

* * * * *